United States Patent [19]

Kelm et al.

[11] 4,419,543
[45] Dec. 6, 1983

[54] TONE ACTIVATED HOLD CIRCUIT

[76] Inventors: Edward C. Kelm, 1136 Wellington, Pasadena, Calif. 91103; Stephen Kurtin, 3835 Kingswood Rd., Sherman Oaks, Calif. 91403

[21] Appl. No.: 380,038

[22] Filed: May 20, 1982

[51] Int. Cl.³ .............................................. H04M 1/00
[52] U.S. Cl. .................. 179/81 R; 179/99 H; 179/84 VF
[58] Field of Search .............. 179/81 R, 84 VF, 90 K, 179/99 H

[56] References Cited

U.S. PATENT DOCUMENTS

| 2,810,016 | 10/1957 | Knittle . | |
|---|---|---|---|
| 3,143,602 | 8/1964 | Morrison et al. | 179/84 VF |
| 3,413,608 | 11/1968 | Benzuly | 179/84 VF X |
| 3,629,514 | 12/1971 | Flamini, Jr. | 179/99 H |
| 3,725,600 | 4/1973 | Hutton | 179/81 R X |
| 4,001,520 | 1/1977 | Walman et al. | 179/81 R |
| 4,004,106 | 1/1977 | Yachabach et al. | 179/99 H X |
| 4,011,413 | 3/1977 | Phillips | 179/81 R |
| 4,093,829 | 6/1978 | Silberman | 179/81 R |
| 4,100,375 | 7/1978 | Noller | 179/99 H X |
| 4,140,880 | 2/1979 | Deutsch et al. | 179/99 H X |
| 4,219,701 | 8/1980 | Feiner | 179/99 H |
| 4,223,183 | 9/1980 | Peters, Jr. | 179/84 VF X |
| 4,243,844 | 1/1981 | Waldman | 179/81 R |
| 4,365,117 | 12/1982 | Curtis | 179/99 H |

Primary Examiner—A. D. Pellinen
Assistant Examiner—Keith E. George
Attorney, Agent, or Firm—Spensley, Horn, Jubas & Lubitz

[57] ABSTRACT

A hold circuit for use with Dual Tone Multi Frequency telephone systems including a bistable circuit connected across the telephone line, the ON state drawing sufficient current from the telephone line to hold the circuit and the OFF state being substantially infinite impedance, a tone detection circuit which triggers the bistable circuit ON when the two frequencies produced by the "*" button are sensed, and a means for triggering the bistable circuit OFF responsive to the drop in line voltage due to a telephone on the line being taken off-hook.

17 Claims, 2 Drawing Figures

4,419,543

TONE ACTIVATED HOLD CIRCUIT

BACKGROUND OF THE INVENTION

1. Field of the Invention

This invention relates to telephone equipment, and more particularly to hold circuitry for use with telephones using tone actuated dialing systems.

2. Prior Art

While nominally controlled by the subscriber, connecting and disconnecting telephone circuits is actually accomplished at the telephone company central office in response to the conditions appearing on the line. In the case of a disconnection, central office equipment monitors the load on the line presented by the originating subscriber's telephone, and disconnects the circuit shortly after the load disappears. In order to allow a subscriber to hang up one telephone and later pick up on the same or another instrument, a "hold" feature is provided on some systems. The hold function is normally accomplished by connecting a resistor across the line to simulate an instrument load, after which the phone can be put on-hook without a disconnect. There are several methods in the prior art for mechanizing such a hold function.

In one system, a momentary button switch on the instrument energizes an electrically latched relay which in turn connects the required resistor across the line. The phone may then be put on-hook without a disconnect. When any phone on the system is subsequently taken off hook, the latched relay is deenergized and the resistor thus disconnected and the hold removed.

A second system for connecting and disconnecting the hold resistor utilizes a silicon controlled rectifier in series with the hold resistor. The silicon controlled rectifier is switched on by a momentary button switch on the phone, effectively connecting the hold resistor across the line. Hold is cancelled by switching the silicon controlled rectifier off in response to the reduced line voltage which occurs when a phone is taken off-hook.

The prior art systems have several disadvantages. For example, they either require substantial extra wiring or they require extra equipment at each telephone on the line. They may also require access to a source of power, either batteries or a power line. A further disadvantage is that a special button for the hold function must be installed if ordinary single line telephones are to be used. Such buttons are combersome, detract from the aesthetics of the installation and present extra service problems.

The present invention does not suffer from these disadvantages. An ordinary single line instrument, without modification, may be used with the invented system; only one simple circuit is used to service a line irrespective of the number of telephones in use on the line; and the hold circuit requires no external power. The invented hold circuit can be made to be plugged into any unused jack on the line.

SUMMARY OF THE INVENTION

The present invention is intended to be used in conjunction with telephones having tone actuated dialing systems. Such dialing systems have been standardized in what is known as the Dual Tone Multi Frequency ("DTMF") system now in use throughout the world. Using this system, a dialing pad on most telephones consists of twelve buttons arranged in a rectangular array of three columns and four rows. A fourth column appears on telephones used for military communications but not on telephones available to most people. Each button is assigned a tone which is a mixture of two frequencies and dialing is accomplished by sequentially depressing the appropriate buttons.

One or both frequencies which comprise the signal generated by a selected button on such a telephone is used to actuate the hold function in the present invention. Preferably a seldom used button, such as the "*" button, is selected for the hold function, but any button can be assigned if desired.

The present invention provides a simple and economical hold function for tone dial telephone systems. One device connected into the system provides the function for all telephones on any one line and no modification or additions to the instruments are required. The "hold" circuit is activated by depressing the button which has been assigned the "hold" function, for example the "*" button. The hold is automatically released when any telephone on the line is subsequently taken off-hook.

The circuit consists of three sections which perform the required operative functions. The first section detects the tone signals from the button which has been assigned the hold function. The second section is a bistable load section which is triggered ON by the tone detector section. In its ON state, the bistable load section draws current from the telephone line maintaining the "hold". The third section resets the bistable load section to OFF when a telephone on the system is taken off-hook after "hold" has been actuated.

An important feature of the present invention is the fact that it draws substantially zero power from the telephone line when hold is not actuated. The switching function is powered by the locally generated tones so that access to auxiliary power, such as batteries or house current is unnecessary. This is important since one requirement for being permitted to connect auxiliary equipment to large telephone systems, such as the Bell System, is that very little current be drawn from the line by the equipment. On the Bell System, the total subscriber load is limited to about five microamperes when all telephones are on-hook.

DETAILED DESCRIPTION OF THE INVENTION

Figure 1:
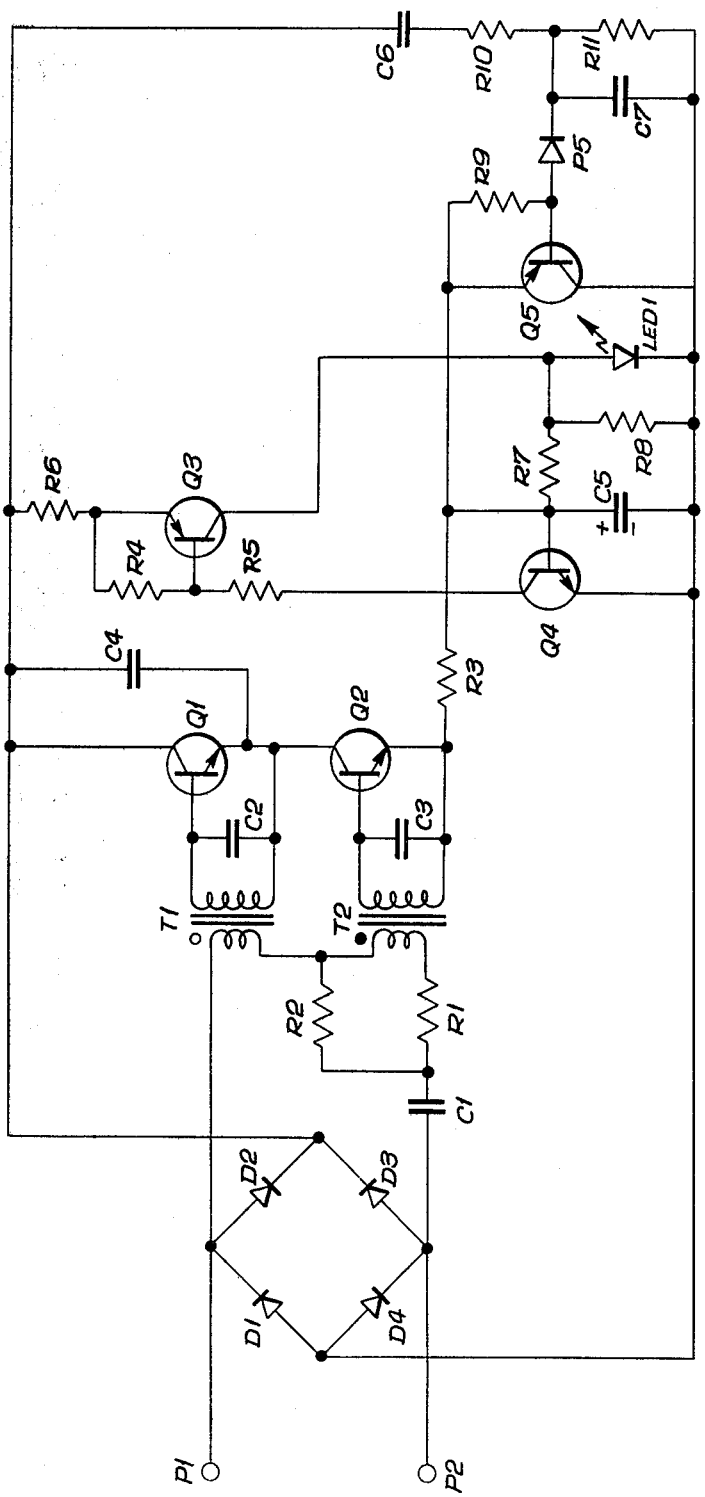
FIG. 1 is a schematic diagram of a first embodiment of the invented circuit.

A first embodiment of the present invention is shown in FIG. 1 where a pair of terminals P1 and P2 are shown for connection to a telephone line servicing Dual Tone Multi Frequency telephones ("DTMF"). Only one hold circuit is required for any single line irrespective of the number of telephones connected to the line. Since there are no controls for the user to manipulate, the circuit need not be installed adjacent to a telephone instrument but can, for example, be plugged into an unused jack.

The circuit requires no standby power from the telephone line, which allows it to be used on telephone systems, such as the Bell System, without access to an independent source of power. Switching power is provided by the locally generated tones and only such power as is required to hold the line is used during the time the line is being held. As noted above, the hold circuit includes three sections: a tone detector, a bistable load section, and a reset section. The tone detector and reset sections are capacitively coupled to the telephone line so that no D.C. power is used, and the bistable load presents a substantially infinite D.C. resistance under standby conditions.

The hold circuit is energized by depressing a selected button, for example the "*" button on the telephone. Depressing the "*" button causes a pair tones having frequencies of 941 Hz and 1209 Hz to be generated. These tones appear on the line and are coupled into the primaries of transformers T1 and T2 by capacitor C1 and resistors R1 and R2. The value of capacitor C1 is chosen to pass these frequencies while blocking the low frequency (15 to 68 Hz) ring voltage. Transformer T1 is tuned to 941 Hz by capacitor C2, and transformer T2 is tuned to 1209 Hz by capacitor C3. For economic production, the transformers may be chosen to be identical. If such is the case, transformer T1 will have a lower impedance at resonance than transformer T2. This difference is compensated by resistor R2 which supplies extra signal to transformer T1. The transformers form resonant circuits of sufficiently high Q that standard tones other than 941 Hz will appear at the secondary of transformer T1 attenuated by about a factor of four relative to 941 Hz, and tones other than 1209 Hz will be similarly attenuated by transformer T2. This high Q also allows the primaries of transformer T1 and T2 to be connected in series, since transformer T2 is a low impedance at 941 Hz and transformer T1 is a low impedance at 1209 Hz. This results in a smaller load on the line and a smaller value for capacitor C1.

When the "*" is depressed on a telephone, both tones, 941 Hz and 1209 Hz appear on the line with an amplitude of about 1.5 volts p-p each. The turns ratio of transformer T1 would result in a voltage of about 2 volts p-p appearing at the secondary of T1. However, the base-emitter junction of transistor Q1 limits this voltage to about 1 volt p-p by conducting whenever it is forward biased. This takes place at the positive peaks of the 941 Hz signal. These pulses of base current in transistor Q1 cause pulses of collector current in transistor Q1 which keep capacitor C4 discharged. Similarly, transistor Q2 has pulses of base current flowing at 1209 Hz. The resultant collector current pulses of transistor Q2 tend to charge capacitor C4. If capacitor C4 were not present, the series connection of transistors Q1 and Q2 could only conduct if their base current pulses happen to occur simultaneously. With capacitor C4 present, transistor Q2 can product by charging capacitor C4. This charging current flows through resistor R3 to the base of transistor Q4.

The series connection of transistors Q1 and Q2 forms an AND gate logic element. If the 1209 Hz signal is present, but the 941 Hz is missing, for instance as might happen if the "7" button is depressed, transistor Q2 can only flow current until capacitor C4 is charged. After a few pulses, capacitor C4 will be fully charged and no more current will flow through resistor R3. Similarly, if the 941 Hz is present, but the 1209 Hz is missing, as might happen if the "0" button is depressed, then capacitor C4 will be discharged, but transistor Q2 will never conduct. Obviously, if neither frequency is present, neither transistor will conduct. Since DTMF tones which are not locally generated are about one fourth the amplitude of locally generated tones, they will not cause either transistor Q1 or Q2 to conduct, even if the distant party depresses the "*" button. Although this circuit forms an effective and simple discriminator for the "*" pair of tones, it still may produce momentary pulses through resistor R3 when subjected to fast transients. In addition, a few pulses may flow through transistor Q2 until capacitor C4 is charged, as mentioned above in the example of the "7" button being depressed. (The "1" and "4" can also do this.) Discrimination against these short pulses takes place in the bistable load section to be described next.

A bistable load section is coupled to the line through diode bridge D1-D4. The purpose of diode bridge D1-D4 is twofold. Firstly, the normal ring signal in most telephone systems is an AC signal having an amplitude of approximately 90 volts. Such a signal would reverse bias some of the transistors in the circuit, shorting the ring signal and possibly destroying the transistors. Secondly, the diode bridge makes the circuit independent of polarity so that it is not necessary to check the polarity of the line voltage when connecting the hold circuit.

The bistable circuit is formed by transistors Q3 and Q4. The only source of base current for transistor Q3 is the collector current of transistor Q4, flowing through resistor Q5. Resistor R4 is present to insure that leakage currents of either transistor Q3 or Q4 will not trigger the bistable. In a like manner, assuming no current is flowing from the tone detector through resistor R3, transistor Q4 has no source of base current and both resistors R7 and R8 control any leakage currents. The circuit is thus stable with no current flowing.

If the local "*" button is depressed, however, the stream of pulses will charge capacitor C5 until transistor Q4 is biased on. The collector current of transistor Q3 will flow through resistor R8 and the light emitting diode LED1. The light emitting diode LED1 will limit the voltage across resistor R8 to about 1.6 volts. This is sufficient to turn on transistor Q4 through resistor R7. At this point, the current pulses from resistor R3 are no longer necessary and the "*" button may be released. The circuit is now in a stable condition with both transistors Q3 and Q4 on. The light emitting diode LED1 will be lit by the collector current of transistor Q3 and some current will be drawn from the line through resistor R6. Resistor R5 is provided to prevent transistor Q4 from drawing excess current through the base of transistor Q3. Although the circuit would still function, transistor Q3 might not supply much of the current to resistor R6 through its collector, and the light emitting diode LED1 would not be lit.

Now assume that a few pulses of current flow in resistor R3 from a line transient or similar cause. If capacitor C5 is chosen large enough, the pulses will not charge capacitor C5 enough to turn on transistor Q4. After the pulses cease, capacitor C5 will discharge through resistors R7 and R8. The circuit can thus be made insensitive to spurious signals while reliably detecting locally generated "*" tones. If the delay introduced by capacitor C5 is made longer than required to discriminate against noise and transients, perhaps as long as 0.5 to 1.0 seconds, two other benefits are realized. First, the user has an audible indication that the circuit has been activated. This happens because the addition of resistor R6 across the line when the bistable has been turned ON causes a perceptible reduction in the volume of the tones heard by the user. Second, other services requiring use of the "*" button may still be used. A depression of the "*" long enough to register a decimal point in an electronic banking sytem, for example, will not activate the bistable.

Once the bistable is ON, the telephone may be returned to the on-hook state and the current through resistor R6 will be sufficient to hold the line.

When the bistable has been triggered on, the voltage on the line might drop from about 6 volts to about 5 volts, due to the extra current being drawn through resistor R6. When the telephone is returned to the on-hook state, the voltage will rise to about 15 volts. This is because resistor R6 limits the bistable current to a value less than that typically drawn by a telephone. When a telephone on the line is taken off-hook, the voltage will again drop to 6 volts. The reset circuit detects this drop in voltage and resets the bistable to the OFF state.

When the line voltage drops, capacitor C6 will couple the drop to resistor R10, with a time constant of about 1.5 milliseconds. This drop is divided by 4 by the voltage divider made up of resistors R10 and R11. Thus the cathode of diode D5 is driven negative for about 1.5 msec., by roughly 1.5 volts. This turns on transistor Q5 which discharges capacitor C5 enough to turn off transistor Q4. This causes transistor Q3 to turn off and returns the bistable to the OFF state. The voltage divider prevents speech or other audio signals from activating the reset, and capacitor C7 reduces the amplitude of locally generated tones so that depressing the "*" button will not simultaneously reset and set the bistable circuit. The time constant of capacitor C7 and the voltage divider is preferably about 0.3 msec. so that tones at about 1000 Hz are attenuated by a factor of 2, but the coupling of the drop in voltage from capacitor C6 is not appreciably affected. Leakage of transistor Q5 is minimized by resistor R9, and diode D5 prevents positive changes in voltage, such as might be caused by going onhook without the hold activated, from breaking down the emitter base junction of transistor Q5.

In the example described above, use of the "*" button as the hold actuating button was discussed by way of example. It should be understood however, that any button could be selected for use as the hold button so long as the tuned circuits are tuned to the frequencies generated by the selected button. If one of the numbered buttons is chosen, however, the time constant of resistor R3 and capacitor C5 must be made long enough so that inadvertent actuation of the hold function will not occur during dialing.

Even the "*" button has some uses other than as a hold button, however, and if such uses are contemplated, the time constant of resistor R3 and capacitor C5 must be made long enough to accommodate the dual use. An actuation time of 0.5 to 1.0 seconds for the hold function, as was suggested above, appears to be a reasonable compromise; long enough to make inadvertent actuation unlikely, but not so long as to make intentional actuation inconvenient.

Figure 2:
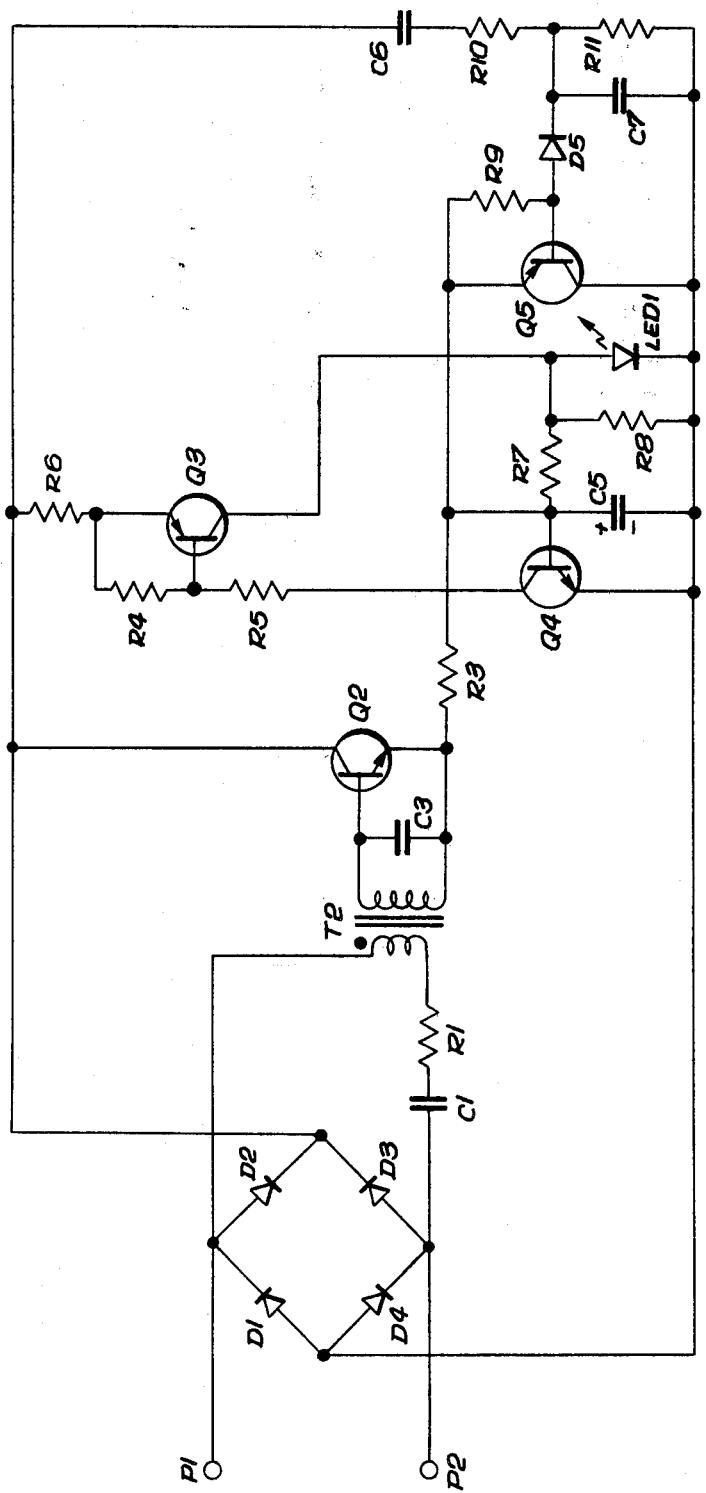
FIG. 2 is a schematic diagram of a second embodiment of the invented circuit.

A second embodiment of the invention, shown in FIG. 2, involves only one tuned circuit, which is a simplification as compared to the embodiment of FIG. 1. However, the actuation tone will of necessity be one which frequently appears during ordinary dialing sequences so that it will be necessary to either make the time constant of resistor R3 and capacitor C5 long enough to avoid inadvertent actuation, or to provide some other means to accomplish that result.

In the embodiment of FIG. 2, transformer T2 and capacitor C3 are tuned to one of the frequencies used in the DTMF system, for example 1209 Hz, which is produced by the "1", "4", "7", and "*" buttons. Depressing any one of these buttons for sufficient time to charge capacitor C5 to the trigger level of the bistable load section will actuate the hold function.

The operation of the remaining parts of the circuit are the same as described for the embodiment of FIG. 1.

The embodiments of a tone activated hold circuit have been described. Various modifications within the spirit of the invention will occur to those skilled in the art and such modifications are intended to be within the scope of the following claims.

We claim:

1. A telephone line hold circuit for a tone actuated dialing telephone system powered entirely from the telephone line which comprises:
   a bistable load circuit coupled across a telephone line, said bistable load circuit having an ON state whereby current from said telephone line will flow through said bistable load circuit, and an OFF state whereby substantially no current will flow through said bistable load circuit;
   means responsive to and powered by a signal corresponding to a selected dialing tone of said telephone system for turning said bistable load circuit ON; and
   reset means responsive to an increase in load across said telephone line for turning said bistable load circuit OFF.

2. A telephone line hold circuit as recited in claim 1 and further including delay means for causing the tuning ON of said bistable load circuit to be delayed for a predetermined time after application of said dialing tone.

3. A telephone line hold circuit as recited in claims 1 or 2 wherein said means responsive to a signal corresponding to a selected dialing tone comprises a tuned circuit coupled to said telephone line and tuned to one or more frequencies associated with said tone, and said circuit couples a signal to said bistable load circuit whenever said signal corresponding to a dialing tone appears on said telephone line.

4. A telephone line hold circuit as recited in claim 3 wherein said bistable load circuit is coupled to said telephone line through a bridge rectifier.

5. A telephone line hold circuit as recited in claim 3 and further including a light emitting diode coupled to said bistable load circuit whereby said light emitting diode will emit light when said bistable load circuit is in its ON state.

6. A telephone line hold circuit powered entirely from the telephone line which comprises:
   a bistable load circuit coupled across a telephone line, said bistable load circuit having an ON state whereby current from said telephone line will flow through said bistable load circuit and an OFF state whereby substantially no current will flow through said bistable load circuit;
   a tuned circuit coupling said telephone line to said bistable load circuit whereby a signal on said telephone line comprising an alternating current having one or more preselected frequency components will couple a signal to said bistable circuit to turn said bistable load circuit ON; and
   capacitor means coupling said telephone line to said bistable load circuit whereby a drop in voltage on said telephone line will be coupled to said bistable load circuit to turn said bistable load circuit OFF.

7. A telephone line hold circuit for telephone lines as recited in claim 6 where said bistable load circuit is coupled to said telephone line through a bridge rectifier.

8. A telephone line hold circuit as recited in claim 6 wherein said alternating current comprises a signal having two frequency components wherein said two components are the two frequencies associated with a single button of a Dual Tone Multi Frequency telephone system.

9. A telephone line hold circuit for telephone lines as recited in claim 8 where said bistable load circuit is coupled to said telephone line through a bridge rectifier.

10. A telephone line hold circuit as recited in claims 6, 7, 8 or 9 wherein said preselected frequency components are associated with the "*" button.

11. A telephone line hold circuit for telephone lines as recited in claims 6, 7 8 or 9 wherein said tuned circuit comprises:
one or more tuned transformers whose primaries are coupled in series and the resulting combination coupled across said telephone line, said transformers being tuned to said one or more preselected frequency components respectively; and
a transistor coupled across the secondary of each said transformer, said transistors being coupled in series and coupling said telephone line to said bistable load circuit whereby a signal on said telephone line comprising said one or more preselected frequency components will cause current to flow through said series coupled transistors and will couple a signal to said bistable load circuit to turn it ON.

12. A telephone line hold circuit as recited in claims 6, 7, 8 or 9 and further including delay means for delaying the turning ON of said bistable circuits for a preselected time after said alternating current appears on said telephone line.

13. A telephone line hold circuit for telephone lines as recited in claims 6, 7, 8, or 9 wherein said bistable load circuit comprises a resistance and an NPN and a PNP transistor, the base of said NPN transistor being coupled to the collector of said PNP transistor and the base of said PNP transistor being coupled to the collector of said NPN transistor, the emitter of one of said transistors being coupled to one side of said telephone line, the emitter of the other of said transistors being coupled to one side of said resistance, and the other side of said resistance being coupled to the other side of said telephone line.

14. A telephone line hold circuit for telephone lines as recited in claim 13 and further including a light emitting diode coupled to said bistable circuit whereby said light emitting diode will emit light when said bistable circuit is in its ON state.

15. A telephone line hold circuit for telephone lines as recited in claim 13 where said signals coupled to said bistable load circuit to turn it ON or OFF are coupled to the base of one of said transistors.

16. A telephone line hold circuit powered entirely from the telephone line which comprises:
first and second transistors, one of said transistors being NPN and the other being PNP, the base of said first transistor being coupled to the collector of said second transistor and the base of said second transistor being coupled to the collector of said first transistor, the emitter of said first transistor being coupled to one side of said telephone line:
a resistor coupled between the second side of said telephone line and the emitter of said second transistor;
first and second transformers having their primaries capacitively coupled to said telephone line;
first and second capacitors coupled across the secondaries of said first and second transformers respectively whereby said transformers will be tuned to first and second frequencies respectively;
third and fourth transistors having their base emitter diodes coupled across the secondaries of said first and second transformers respectively and the emitter of said third transistor coupled to the collector of said fourth transistor, the collector of said third transistor being coupled to the first side of said telephone line and the emitter of said fourth transistor being coupled to the base of said second transistor; and
a circuit comprised of a capacitor and a fifth transistor for coupling a drop in telephone line voltage to the base of said first transistor.

17. A telephone line hold circuit as recited in claim 16 wherein said series circuits including said first and second transistors and said resistor is coupled to said telephone line through a bridge rectifier circuit.

* * * * *